United States Patent [19]

Garvey et al.

[11] Patent Number: 4,542,802
[45] Date of Patent: Sep. 24, 1985

[54] ENGINE AND TRANSMISSION CONTROL SYSTEM FOR COMBINES AND THE LIKE

[75] Inventors: Daniel C. Garvey, Fort Collins; Richard D. Fiolkoski, Ault, both of Colo.

[73] Assignee: Woodward Governor Company, Rockford, Ill.

[21] Appl. No.: 635,470

[22] Filed: Jul. 27, 1984

Related U.S. Application Data

[63] Continuation of Ser. No. 364,635, Apr. 2, 1982, abandoned.

[51] Int. Cl.⁴ .................... B60K 23/00; F16H 39/46
[52] U.S. Cl. ...................... 180/306; 180/69.3; 60/327; 60/390; 60/391; 60/449
[58] Field of Search ........... 60/327, 388, 389, 390, 60/391, 401, 431, 449, 911; 92/DIG. 4; 180/6.2, 6.24, 6.3, 6.32, 6.48, 6.5, 6.62, 335, 336, 306, 307, 69.3

[56] References Cited

U.S. PATENT DOCUMENTS

| | | | |
|---|---|---|---|
| 3,442,277 | 5/1969 | Barnes . | |
| 3,803,843 | 4/1974 | Nyman et al. | 60/449 |
| 3,864,915 | 2/1975 | Metailler | 60/327 |
| 3,943,712 | 3/1976 | Stuhr | 60/327 |
| 4,130,980 | 12/1978 | Fardal et al. . | |
| 4,180,979 | 1/1980 | Cornell | 60/431 |
| 4,274,257 | 6/1981 | Koch, Jr. et al. | 60/431 |
| 4,337,587 | 7/1982 | Presley | 60/449 |
| 4,348,855 | 9/1982 | DePauw et al. . | |
| 4,351,152 | 9/1982 | Reynolds et al. | 60/449 |
| 4,395,199 | 7/1983 | Izumi et al. | 60/449 |

FOREIGN PATENT DOCUMENTS 36 2/1979 Int'l Pat. Institute ............... 60/431

OTHER PUBLICATIONS

Woodward Bulletin 82506D, 2301 Proportional Actuator.
National Semiconductor Bulletin LM2907, LM2917, pp. 9-80-9-92.

*Primary Examiner*—Deborah L. Kyle
*Assistant Examiner*—Richard Klein
*Attorney, Agent, or Firm*—Leydig, Voit & Mayer, Ltd.

[57] ABSTRACT

A control system is provided for a combine or other vehicle having an engine for driving both the ground wheels of the vehicle and at least one auxiliary mechanism, such as the crop-processing mechanisms of a combine. The engine is coupled to the ground wheels through a hydrostatic transmission, and the power take-off for the auxiliary mechanism is located on the engine side of the transmission. A speed droop governor regulates the fuel input to the engine in response to changes in the engine speed. Transmission control means adjusts the setting of the hydrostatic transmission, and thus the load applied to the engine via the transmission, in response to changes in engine speed or another parameter that varies with engine load so as to control the speed changes effected by the droop governor. The combined effect of the speed droop governor and the transmission control means is to gradually reduce the operating speed of the engine as the fuel input to the engine is increased, with the total speed reduction over the full load range of the engine comprising from about 1% to about 5% of the no-load speed.

16 Claims, 13 Drawing Figures

_Fig. 12._

Fig. 13.

ENGINE AND TRANSMISSION CONTROL SYSTEM FOR COMBINES AND THE LIKE

This application is a continuation of application Ser. No. 364,635, filed Apr. 2, 1982, now abandoned.

DESCRIPTION OF THE INVENTION

This invention relates to automatic control systems for controlling the drive trains, particularly the engines and transmissions, of vehicles in which the engine drives not only the ground wheels but also various auxiliary mechanisms carried by the vehicle. The invention is especially applicable to crop-harvesting combines which have hydrostatic transmissions for controlling the speed ratio between the engine and the ground wheels, and a power takeoff between the engine and the transmission for driving the crop-harvesting mechanisms.

Crop-harvesting machines such as combines are normally driven by internal combustion engines controlled by mechanical "speed droop" governors having a relatively high percentage of droop. As is well known, a speed droop governor automatically changes the speed setting for the engine as the fuel input to the engine is adjusted for different loads, causing the engine speed to progressively "droop" from the no-load speed as the load increases. The magnitude of the speed droop is usually expressed as the percent change in the operating speed for the engine between no load and full load operation. For example, an engine-governor combination might run at 2500 RPM at no load and at 2250 RPM at full load, which would be a speed droop of 10%. This droop characteristic is one way of providing a stable governor control system which does not "hunt" about a single operating speed, because the operating speed always changes slightly with any change in load.

The engine in a combine normally drives both the ground wheels and the crop-harvesting mechanisms. Consequently, the actual engine speed varies over the droop range (e.g., 2500 to 2250 RPM) as the engine load changes due to (1) variations in the terrain over which the combine is being driven (e.g., uphill, downhill, mud, etc.), (2) increasing weight of the harvested crop stored on the combine, and (3) load changes on the crop-harvesting mechanism due to variations in crop density, moisture conditions and the like. Although these engine speed changes are those dictated by the droop characteristic of the governor, optimum crop harvesting generally requires that the cylinder of the crop-harvesting mechanism be operated at a constant RPM. As a result, a good operator will continually move the control lever of the transmission, which is typically a hydrostatic transmission, in an attempt to keep the cylinder speed of the crop-harvesting mechanism as constant as possible. Many combines actually have a tachometer, indicating engine speed, mounted in the cab to assist the operator in his attempts to maintain the desired cylinder speed. Unfortunately, however, it is difficult for the operator to achieve accurate speed control, particularly over extended periods of operation or when the operator is unskilled, and poor speed control is one of the most common causes of excessive crop losses during harvesting.

Another device used to assist combine operators is an electronic grain loss monitor which provides a continuous indication of the amount of grain being lost from the combine. Here again, however, the best the operator can be expected to do is maintain the grain loss within a certain loss range. The actual losses suffered can vary widely, depending upon the skill and fatigue levels of the operators. Minimizing grain losses is not an easy task because several different load conditions can be varying at the same time. For example, the ground wheels of the vehicle can be travelling over a changing terrain at the same time that changes are occurring in the crop density and the weight of the harvested crop stored on the combine. Moreover, the operator is often not certain in which direction the transmission should be adjusted to compensate for an increase in grain loss.

It is a primary object of the present invention to provide an improved control system which automatically regulates the drive train of a combine to operate both the crop-harvesting mechanisms and the engine at high levels of efficiency in the face of changing load conditions on both the vehicle and the harvesting mechanisms. A related object of the invention is to provide such an improved control system which quickly and automatically compensates for variations in the crop being harvested and/or the terrain over which the combine is being driven.

Another important object of this invention is to provide such an improved control system which automatically reduces the normal speed droop characteristic of the engine governor to provide more efficient operation of the crop-harvesting mechanisms while maintaining efficient operation of the engine under the control of the engine governor, thereby significantly improving the overall productivity of the combine.

It is a further object of the invention to provide an improved control system of the foregoing type which operates the combine at a sustained high efficiency level regardless of the skill or fatigue level of the human operator, while retaining operator control of the combine for emergency situations.

A still further object of the invention is to provide such an improved control system which minimizes grain losses with varying conditions of the crop being harvested.

Yet another object of the invention is to provide such an improved control system which can be economically manufactured and installed, and which has a high degree of reliability over extended periods of operation.

Other objects and advantages of the invention will be apparent from the following detailed description taken in conjunction with the accompanying drawings, in which.

While the invention will be described in connection with certain preferred embodiments, it will be understood that it is not intended to limit the invention to these particular embodiments. On the contrary, it is intended to cover all alternatives, modifications and equivalent arrangements as may be included in the spirit and scope of the invention as defined by the appended claims.

Figure 1:
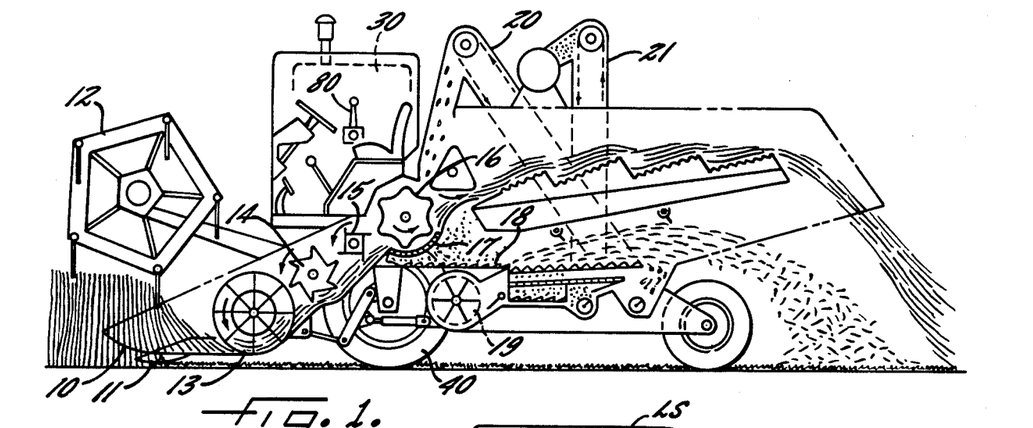
FIG. 1 is a side elevation view of an exemplary combine of the type that can be controlled by a control system embodying the present invention.

Turning now to the drawings and referring first to FIG. 1, a combine is shown harvesting a crop of wheat or similar grain. A plurality of dividers 10 project from the front end of the combine for holding the grain stalks upright while they are cut off just above ground level by a cutter bar 11. The upper portions of the stalks are pushed rearwardly toward the cutter bar by a revolving reel 12. As the grain stalks are cut, they are picked up by a rotating feed screw 13 which conveys the grain stalks upwardly toward a feeder 14 and a pusher 15 which feed the stalks under a thresher cylinder 16. As the grain heads pass between the threshing cylinder 16 and a slotted concave 17, the grain is removed from the heads and drops through the slots of the concave 17 into a cleaning shoe 18. The chaff and short lengths of straw that enter the cleaning shoe along with the grain are separated from the grain by means of a fan 19 and discharged onto the ground through the back end of the combine. Any heads of grain which fall short of the chaff discharge opening are returned to the threshing cylinder by means of a tailings elevator 20. The removed grain is collected in the bottom of the combine and conveyed upwardly by a grain elevator 21 for storage either on the combine itself or on an adjacent trailer.

The combine is driven by a diesel engine 30 controlled by a conventional mechanical droop governor 31 (see FIG. 2) which regulates the fuel input to the engine 30 so that the engine speed follows a "speed droop" characteristic. A typical droop characteristic, exhibiting a speed droop of 10% between no load and full load, is illustrated in FIG. 3. That is, at zero load, when the fuel input to the engine is at a minimum, the engine operates at a speed of 2500 RPM. As the load on the engine is increased, requiring an increased fuel input, the engine speed is gradually reduced in a linear fashion, dropping to a minimum speed of 2250 RPM with a maximum load on the engine, and thus a maximum fuel input to the engine. The fuel input adjustments are made in response to changes in the actual engine speed, which is continually monitored by a suitable speed sensing device such as a flyweight device which produces a mechanical output for positioning the engine fuel rack. In a typical combine, the fuel input to the engine is controlled by the mechanical droop governor, and there is a manual throttle which controls the speed setting for the mechanical droop governor.

Figure 2:
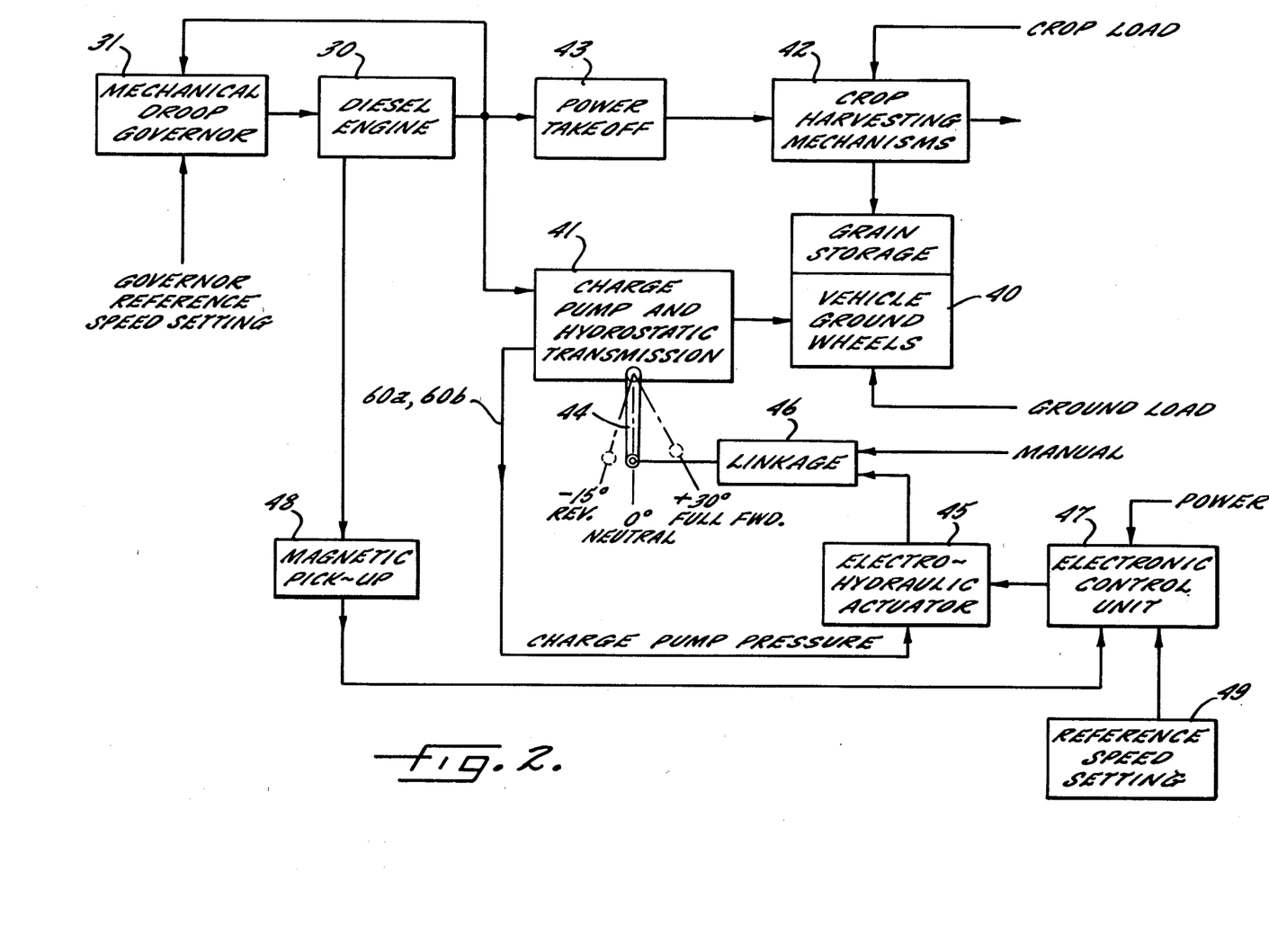
FIG. 2 is a block diagram of the drive train and associated control system, embodying the present invention, for a combine of the type illustrated in FIG. 1.
Figure 3:
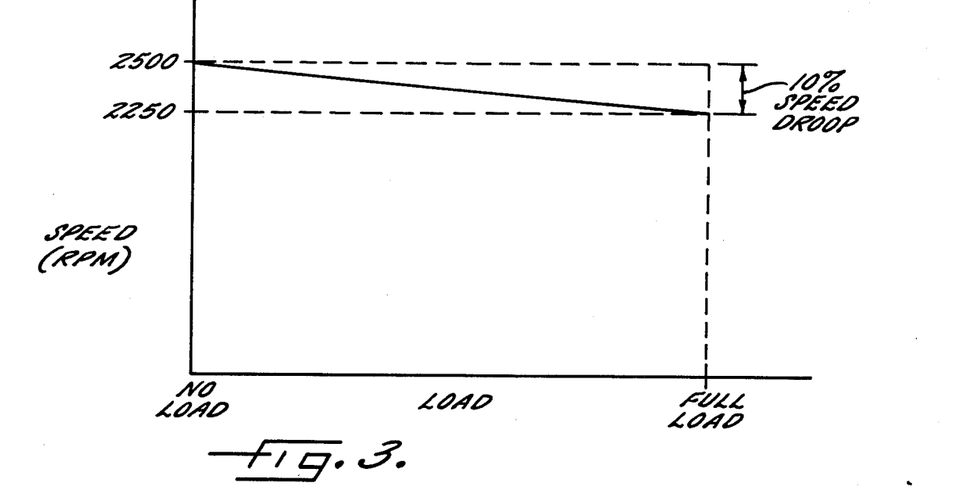
FIG. 3 is a graph illustrating the speed droop characteristic of the engine governor in the system of FIG. 2.

In FIG. 2, a system for controlling the drive train of th combine of FIG. 1 is illustrated in block diagram form. The output shaft of the diesel engine 30 is connected to the ground wheels 40 of the combine through a transmission 41. Most modern combines use hydrostatic transmissions, which offer an "infinitely variable" gear ratio between the drive engine 30 and the ground wheels 40. As a result, the load imposed on the engine 30 through the transmission 41, which will be referred to herein as the "ground load", can be varied over an "infinite" number of settings within the operating range of the transmission. In effect, the setting of the hydrostatic transmission 41 controls the division of the power output of the engine 30 between the ground load and the crop-harvesting mechanisms 42 coupled to the engine through a power takeoff 43 located between the engine 30 and the hydrostatic transmission 41. This power takeoff 43 normally has a fixed gear ratio. The load imposed on the engine by the crop-harvesting mechanisms 42 will be referred to herein as the "crop load".

Both the ground load and the crop load are continually changing, but the magnitude of the changes is usually much greater in the case of the ground load. By adjusting the setting of the hydrostatic transmission 41 with changing load conditions, the total actual load on the engine 30 can be adjusted to control the engine speed. For example, if the combine begins an uphill grade, the ground load increases significantly if the transmission is not adjusted, but the load on the engine 30 can be controlled by adjusting the setting of the transmission 41. Similarly, if the density of the crop increases, the crop load increases, but again the engine load can be controlled by adjusting the setting of the transmission 41 to compensate for the increase in crop load by reducing the ground speed of the combine, thereby reducing the ground load on the engine.

The setting of the hydrostatic transmission 41 is regulated by a control lever 44 which is normally adjusted manually by means of a cable leading to the vehicle cab where it is accessible to the vehicle operator through a suitable control lever or knob. In the particular example illustrated in FIG. 2, the control lever 44 is adjustable over a range of 30° from its neutral position for driving the vehicle in the forward direction, and over a range of 15° from neutral for driving the vehicle in the reverse direction. As the control lever 44 is moved away from neutral in either direction, it progressively increases the speed ratio between the engine and the ground wheels, which has the effect of increasing the ground load on the engine.

In accordance with an important aspect of the present invention, a transmission control system adjusts the setting of the hydrostatic transmission, and thus the ground load applied to the engine via said transmission, in response to changes in the speed of the engine, with the adjustments in the transmission setting changing the engine load according to a "speed droop" characteristic different from that of the droop governor controlling the fuel input to the engine. In the particular embodiment illustrated in FIG. 2, the transmission control system includes an electrohydraulic actuator 45 having an output member which is connected to the transmission control lever 44 through a mechanical linkage 46. Movement of the output member of the actuator 45 is proportional to the magnitude of a d-c. electrical signal supplied to the actuator from an electronic control unit 47.

Figure 4:
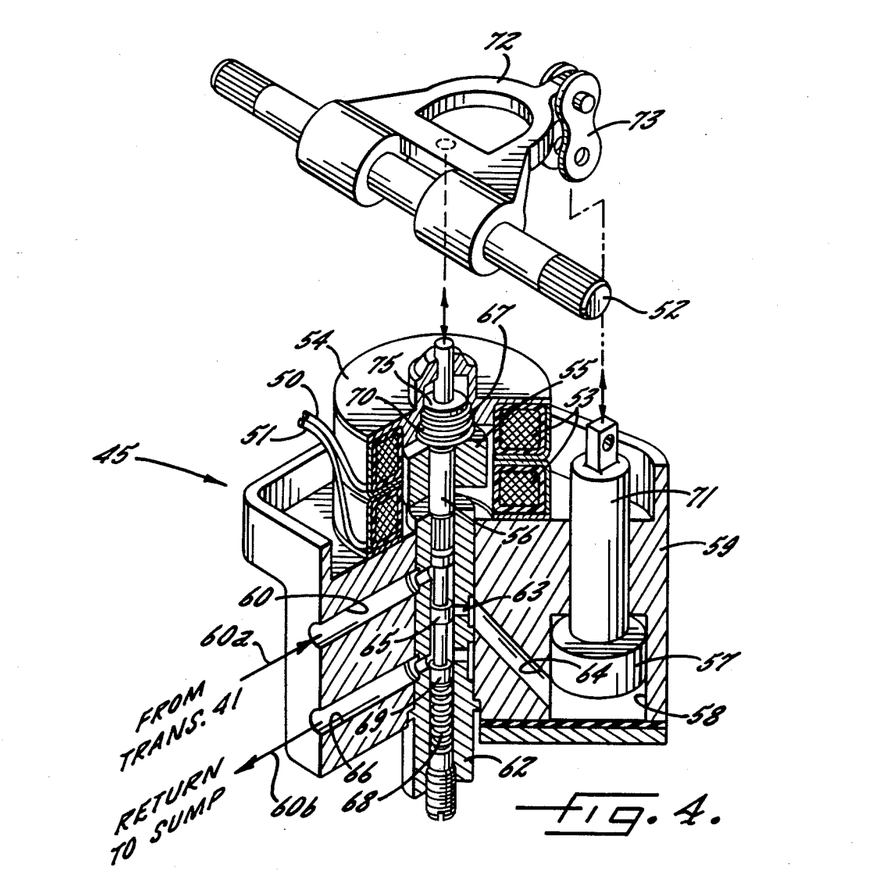
FIG. 4 is a sectional perspective view of the electro-hydraulic actuator used in the system of FIG. 2.

In the preferred embodiment of the invention, the proportional actuator 45 is an electrohydraulic actuator, such as the Woodward Model 2301 Proportional Actuator manufactured by the assignee of the present invention. This particular actuator, which is illustrated in FIG. 4, converts an electrical control signal applied across lines 50 and 51 into a corresponding mechanical displacement in the rotational position of an output shaft 52. The electrical input lines 50 and 51 lead to a dual solenoid winding 53 inside a magnetizable housing 54. The dual solenoid winding 53 has an annular configuration, and a vertically movable armature 55 is disposed within the central cavity formed by the annular winding. This armature 55 is permanently magnetized with opposite magnetic poles located at opposite ends of the armature so that the armature 55 and the housing 54 form a magnetic circuit extending around the dual solenoid winding 53. Consequently, when the solenoid winding 53 is energized by an electrical signal applied across the lines 50 and 51, an axial force is exerted downwardly on the armature 55. The magnitude of this electromagnetic force on the armature 55 is directly proportional to the magnitude of the electrical signal which energizes the winding 53.

Vertical movement of the armature 55 moves a plunger 56 extending downwardly from the center of the armature. The purpose of this plunger 56 is to control the flow of hydraulic fluid to and from the underside of a spring-loaded servo piston 57 which is mounted for vertical reciprocating movement within a cylinder 58 formed by the main housing 59 of the actuator. Hydraulic fluid is continuously supplied to a passageway 60 from a regulated constant pressure source, which is conveniently provided by the charge pump of the hydrostatic transmission 41 via lines 60a and 60b (see FIGS. 2 and 5).

The flow of hydraulic fluid to and from the underside of the piston 57 is regulated by a pilot valve operated by vertical movement of the plunger 56 under the control of the actuating solenoid and its energizing signal. More specifically, the plunger 56 extends downwardly through the central bore of a pilot valve bushing 62 mounted within a cylindrical cavity formed by the housing 59. This bushing 62 forms a lateral control port 63 which opens into a fluid passageway 64 formed by the housing 59 and opening into the lower end of the cylinder 58 beneath the piston 57. The inner end of the control port 63 terminates adjacent a pilot valve land 65 which normally closes the port 63, but opens all or part of the port 63 as the plunger 56 is moved upwardly or downwardly.

When the valve land 65 is moved downwardly, it couples the inner end of the control port 63 with the fluid supply passage 60 so that the supply pressure is exerted on the lower end of the piston 57. Conversely, when the valve land 65 is moved upwardly, it couples the inner end of the control port 63 to a return passage 66 leading to the sump.

When the solenoid winding 53 is not energized, the land 65 on the pilot valve plunger 56 is held in its normal closed position, covering the inner end of the control port 63, by means of upper and lower centering springs 67 and 68. The upper spring 67 bears against the top surface of the armature 55, which in turn is fastened to the upper end of the plunger 56, while the lower spring 68 bears against a disc 69 on the lower end of the plunger 56. In addition, a feedback spring 70 disposed concentrically within the spring 67, exerts a further downward force on the top of the armature 55. The three springs 67, 68 and 70 are chosen so that in the presence of a predetermined energizing signal to the solenoid winding 53, the combination of the electromagnetic force and the opposed spring forces acting on the plunger 56 position the control land 65 over the inner end of the control port 63, which is the closed position of the pilot valve.

To move the servo piston 57 upwardly, the energizing signal to the solenoid winding 53 is increased, thereby increasing the downward electromagnetic force on the plunger 56. This moves the valve land 65 downwardly, coupling the inner end of the control port 63 with the fluid supply line 60. The supply pressure is thus applied to the lower end of the servo piston 57, forcing the piston upwardly with fluid from the upper portion of the cylinder 58 being returned to sump through a bore (not shown) communicating with the return line 66.

As the piston 57 moves upwardly, it raises a piston rod 71 which extends upwardly through the main housing 59 and is connected at its upper end to a lever 72 through a connecting link 73. Upward movement of the piston 57 and its rod 71 rock the lever 72 in a counterclockwise direction about the axis of the output shaft 52 which extends through a pair of bosses on the lever 72 and is fastened thereto. Rocking of the lever 72 in the counterclockwise direction causes the feedback spring 70 to expand, because the upper end of this spring 70 bears against a spring seat 75 whose upper end is seated against the control lever 72. This expansion of the feedback spring 70 reduces the downward spring force on the armature 55 and plunger 56, thereby permitting the lower centering spring 68 to raise the plunger 56 until the valve land 65 is again centered over the control port 63. Closing the control port 63 removes fluid pressure from the underside of the piston 57 to halt the upward movement of the piston.

It will be appreciated that the extent of upward travel of the piston 57 is directly proportional to the magnitude of the electrical signal which energizes the solenoid winding 53. The greater the electrical signal, the greater the downward force on the plunger 56, and thus the farther the lever 72 must be raised before the downward force of the feedback spring 70 is reduced enough to permit the lower spring 68 to restore the control land 65 to its normally closed position. Thus, the rotational displacement of the output shaft 52, which follows the upward movement of the piston 57, is also directly proportional to the magnitude of the energizing signal supplied to the winding 53.

To move the servo piston 57 downwardly, the energizing signal to the solenoid winding 53 is decreased, thereby reducing the downward electromagnetic force on the plunger 56. This causes the lower spring 68 to move the plunger 56 and its land 65 upwardly, coupling the inner end of the control port 53 with the return passageway 66. This reduces the pressure on the lower end of the servo piston 57, allowing the return spring (to be described below) to force the piston downwardly.

As the piston 57 moves downwardly, it lowers the rod 71 and rocks the level 72 in a clockwise direction, thereby turning the output shaft 52 in the clockwise direction. This compresses the feedback spring 70, which in turn increases the downward spring force on the armature 55 and plunger 56 so as to lower the valve land 65 until it is again centered over the control port 63. When the control port 63 is closed, downward movement of the piston 57 is terminated. As in the case of the upward movement of the piston 57, the extent of its downward travel is directly proportional to the magnitude of the electric signal which energizes the solenoid winding 53, and thus the clockwise movement of the output shaft 52 is also proportional to the magnitude of that energizing signal.

Figures 5, 6:
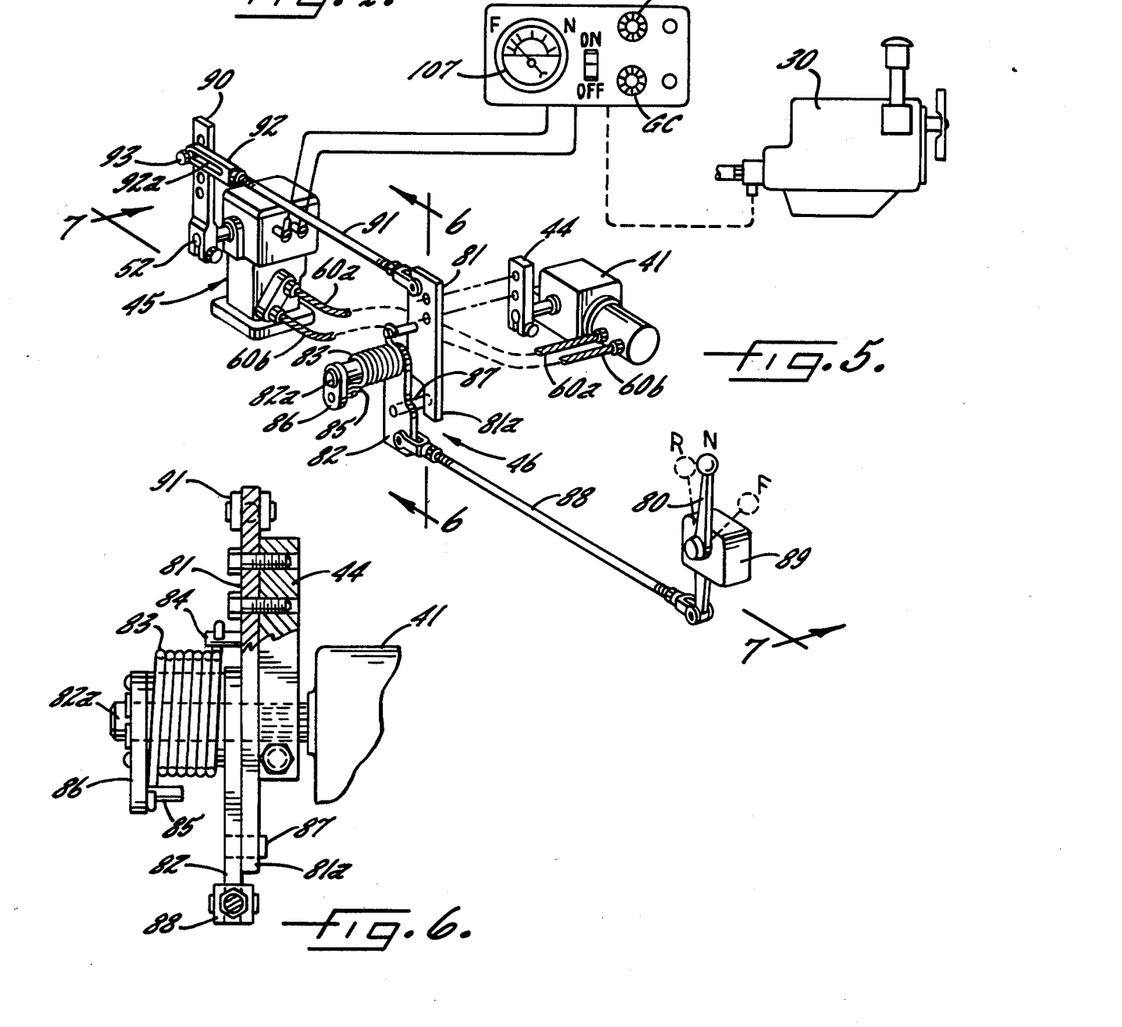
FIG. 5 is a partially diagrammatic perspective view of the drive train components and associated control system illustrated in FIG. 2.
FIG. 6 is a sectional view taken generally along the line 6—6 of FIG. 5.

The output member of the actuator 45 is connected to the transmission control lever 44 through a mechanical linkage 46 (FIG. 2) which permits the transmission lever to be controlled by either the actuator 45 or a manual control lever 80 located in the cab of the combine where it is accessible to the combine operator. A preferred embodiment of this mechanical linkage is illustrated in FIGS. 5–10. Referring first to FIGS. 5 and 6, the transmission control lever 44 is rigidly fastened to an upper lever arm 81 which is connected to a lower lever arm 82 via a coiled spring 83. One end of the spring 83 is fastened to a pin 84 on the upper lever arm 81, and the other end of the spring is fastened to a pin 85 on a tension adjusting member 86 anchored to the lower lever arm 82. The spring 83 thus biases the upper lever arm 81 in the clockwise direction, as viewed in FIGS. 5 and 7, thereby urging the lower end 81a of the lever arm 81 against a stop pin 87 formed as an integral part of the lower lever arm 82. As will be apparent from the ensuing description, the spring 83 serves as the return spring for the piston 57 in the actuator 45.

Figure 7:
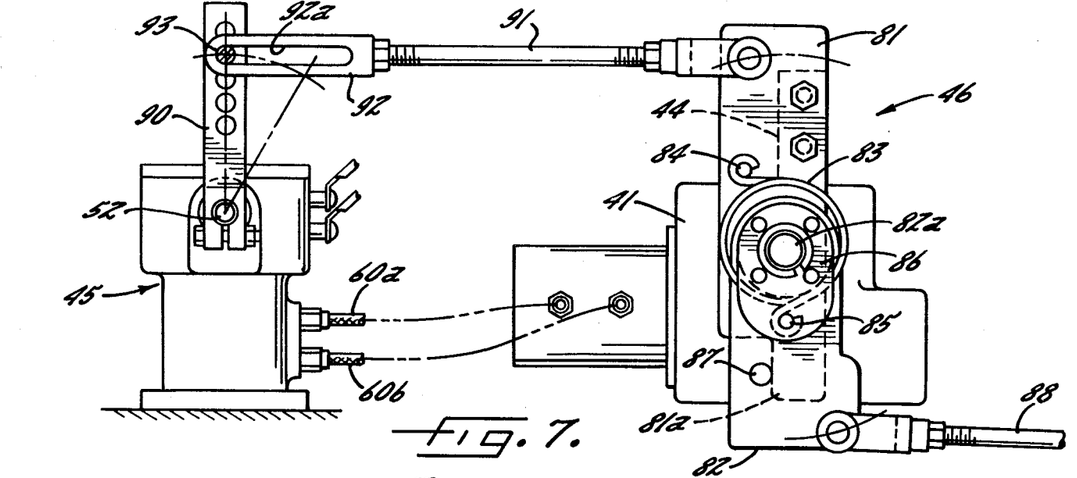
FIG. 7 is an enlarged side elevation taken generally along line 7—7 in FIG. 5.

The lower lever arm 82 is mounted on a stub shaft 82a so that it can be pivoted independently of, and relative to, the control lever 44 and the upper lever arm 81 fastened thereto. The angular position of the lower lever arm 82, and thus the stop pin 87, is always determined by the position of the manual control lever 80, which is connected to the lower end of the lever arm 82 by means of a cable 88 and a friction clutch 89 which holds the lever 80 (and thus the lever arm 82) in any position to which it is moved by the combine operator. As illustrated in FIGS. 5 and 7, the straight vertical position of the control lever 80 represents the neutral position, with a 30° range of "forward" transmission settings on the right side of neutral and a 15° of "reverse" transmission settings on the left side of neutral.

The upper lever arm 81 is connected to the output shaft 52 of the proportional actuator 45 through a connecting rod 91, a lever 90, and a slotted connector 92 receiving a pin 93 formed as an integral part of the lever 90. The length of the slot 92a in the connector 92 represents 45° of angular movement of the lever arm 81 and its pin 93, for a purpose which will be explained in more detail below.

In order to render the actuator 45 operative to impart movement to the transmission control lever 44 by pivoting the upper lever arm 81, the operator must first move the control lever 80 to a position within the 30° "forward" operating range. This will pivot the lower lever arm 82 and its stop pin 87 in the clockwise direction, thereby pivoting the upper lever arm 81 in the same direction due to the biasing force of the spring 83 urging the lower end 81a of the lever arm 81 against the pin 87. The clockwise movement of the upper lever arm 81 in turn pivots the actuator output shaft 52 in the clockwise direction, via the lever 90, the slotted connector 92, and the connecting rod 91.

Figure 8:
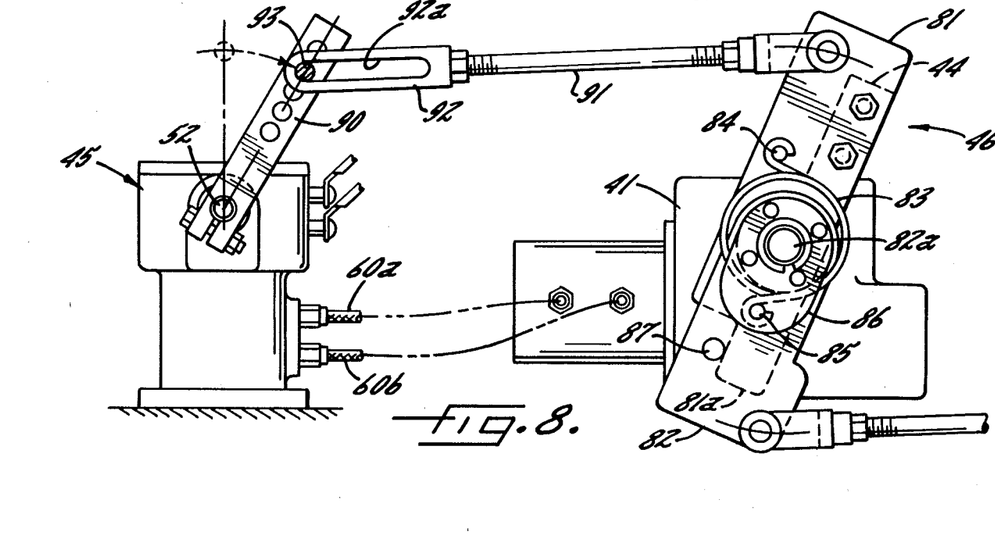
FIG. 8 is the same side elevation shown in FIG. 7 with the manual control lever shifted to the full forward position.
Figure 9:
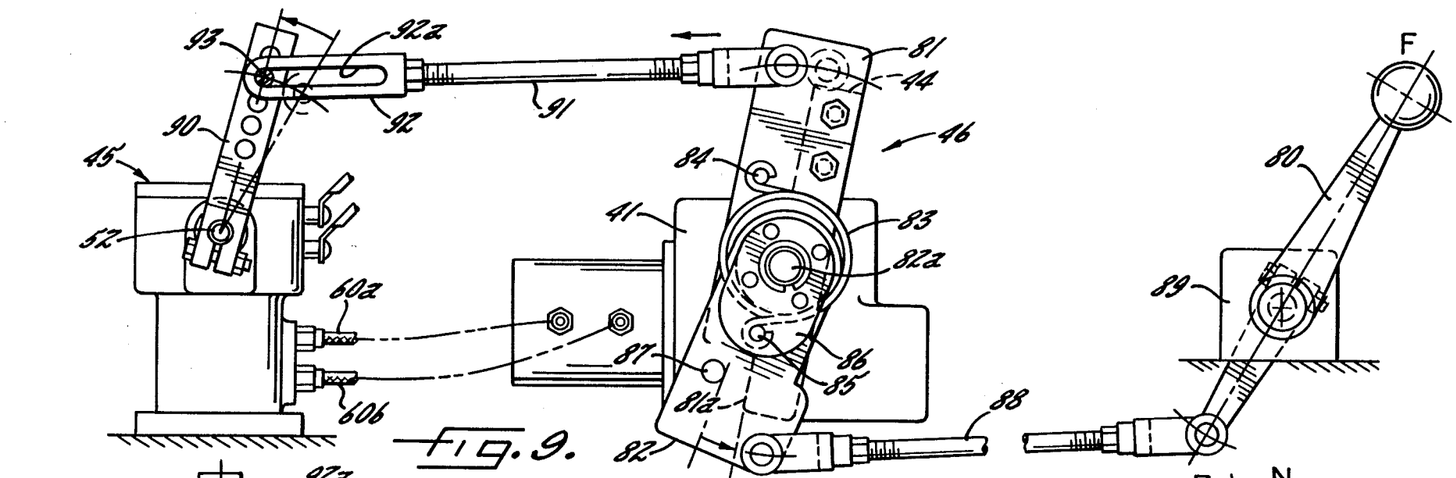
FIG. 9 is the same side elevation shown in FIG. 8 with the actuator shifted toward the neutral position.

FIG. 8 shows the control linkage with the manual lever 80 advanced all the way to the "full forward" position, with the two lever arms 81 and 82 and the actuator output lever 90 all positioned 30° in the clockwise direction away from their "neutral" positions illustrated in FIGS. 5 and 7. With the manual control lever 80 in this position, or at any other position within the 30° "forward" operating range, it can be seen that movement of the actuator output shaft 52 in the counterclockwise direction, as illustrated in FIG. 9, will pull the upper lever arm 81 in the counterclockwise direction against the bias of the spring 83. Such counterclockwise movement of the lever arm 81, of course, results in a corresponding movement of the transmission control lever which is rigidly fastened to the upper lever arm 81. During such counterclockwise movement of the actuator and the upper lever arm 81, the lower lever arm 82 remains in its original position as set by the manual control lever 80, due to the frictional clutch 89 which holds the manual control lever 80 in any position to which it is moved by the manual operator. That is, any counterclockwise movement of the upper lever arm 81 effected by the actuator 45 opens a gap between the lower end 81a of the upper lever 81 and the stop pin 87 on the lower lever 82, as can be seen in FIG. 9.

It will be appreciated that the actuator 45 can never move the upper lever arm 81 in the clockwise direction, because of the lost motion connection formed by the pin 93 and the elongated slot 92a in the connector 92. The proportional actuator 45 is capable of moving the lever 90 (and thus the lever arm 81 and the transmission lever 44) through a range of only 30°, in a counterclockwise direction from the full "forward" position of the lever 90 shown in FIG. 8. As long as the upper lever arm 81 is in the straight vertical position illustrated in FIGS. 5 and 7, movement of the lever 90 by the actuator 45 will have no effect whatever, because the pin 93 on the lever 90 will simply be moved to the right through the slot 92a without imparting any movement to the transmission lever 44 because of the "lost motion" connection formed by the pin 93 sliding in the elongated slot 92a. Similarly, if the manual control lever 80 is positioned anywhere between its neutral position and its reverse position, thereby positioning the pin 93 somewhere within a 15° range of movement from the left-hand end of the slot 92a, any output movement of the actuator output shaft 52 will again be "lost" because the pin 93 will never bottom out on the right-hand end of the slot 92a.

Figure 10:
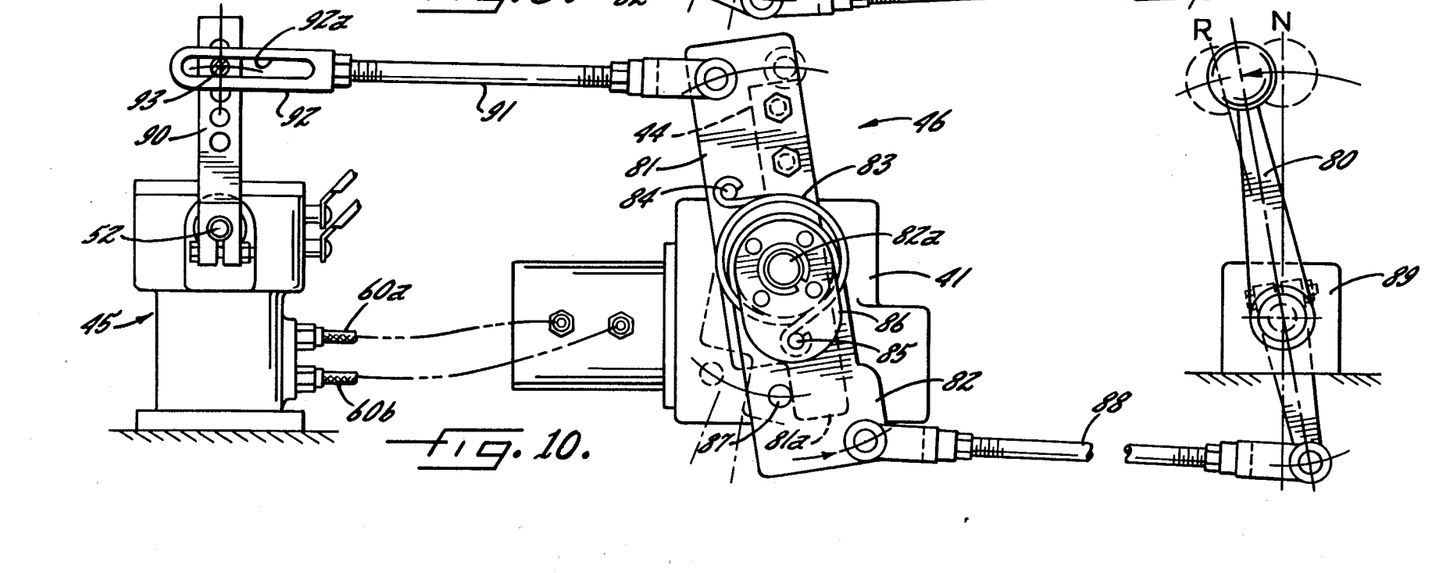
FIG. 10 is the same side elevation shown in FIG. 7 with the manual control lever shifted to the reverse position.

As long as the actuator 45 is de-energized, the manual control lever 80 can be used to move the transmission control lever to any desired position over the entire "forward" and "reverse" operating ranges. More specifically, movement of the control lever 80 in the "forward" direction moves the stop pin 87 in a clockwise direction (FIG. 8), causing the upper lever arm 81 to follow under the biasing force of the spring 83. When the control lever 80 is moved in the "reverse" direction, as illustrated in FIG. 10, the stop pin 87 is moved in a counterclockwise direction, thereby pivoting the lever arm 81 in the same direction with the pin 93 sliding along the slot 92a. On the other hand, if the actuator 45 is energized at some intermediate position between "neutral" and full "forward", that position of the energized actuator will establish an upper limit for the forward movement of the manual control lever 80. For example, if the actuator 45 is energized with the lever 90 at a midway position in the "forward" operating range, as in FIG. 9, movement of the manual control lever 80 beyond the midway position in the "forward" operating range will simply move the stop pin 87 in a clockwise direction away from the lower end 81a of the lever arm 81; the lever arm 81 will not follow the clockwise movement of the stop pin 87 beyond the midway position, because the biasing force of the spring 83 will be insufficient to overcome the resisting force exerted on the pin 93 by the actuator 45. By the same token, if the manual control lever 80 is set at a midway position in the "forward" operating range, that position of the manual lever establishes an upper limit for the forward movement of the lever arm 81 by the spring 83 if the actuator output shaft 52 is turned in the clockwise direction.

One feature of the control linkage of FIGS. 5–10 is that it permits a manual override of the actuator toward the neutral position in the event of an emergency. As just explained, if the actuator output shaft 52 is at some intermediate position within the "forward" operating range, the manual control lever 80 cannot move the transmission control lever 44 any farther toward the full "forward" position. However, if the operator wishes to override the actuator toward the "neutral" position, he simply moves the control lever 80 in that direction to move the stop pin 87 in a counterclockwise direction, thereby turning the upper lever arm 81 in the same direction with the pin 93 riding through the "lost motion" slot 92a.

In summary, it can be seen that the mechanical linkage permits the manual control lever 80 to establish an upper limit within the "forward" operating range; if the manual lever 80 is set at a "forward" position below the full "forward" position, it is impossible for the actuator 45 to move the transmission control lever 90 beyond that limiting position. On the other hand, either the actuator 45 or the manual control lever 80 can always move the transmission control lever toward the "neutral" position. Finally, the actuator 45 can never move the transmission lever 44 within the "reverse" operating range, because the range of movement of the actuator output shaft 52 is limited to the 30° of movement that defines the "forward" operating range.

Returning to FIG. 2, the electronic control unit 47 that energizes the actuator 45 receives input signals from a magnetic pickup device 48 which senses the actual speed of the engine, and from a reference speed signal source 49 which is used to set the desired or "reference" speed of the engine 30. The control unit 47 compares these two input signals, representing the actual and desired engine speeds, and, if they are not equal, generates a "speed error" signal which varies as a function of the difference between the actual and desired speeds. This speed error signal is essentially a DC signal that varies not only in proportion to the magnitude of the speed error, but also according to integral and derivative functions thereof, and with a speed droop characteristic. It has been found that this type of control signal, in combination with the proportional actuator 45, produces smooth, stable regulation of the hydrostatic transmission over the entire range of different field conditions that can be encountered by the combine. This regulation of the hydrostatic transmission continually and automatically adjusts the load on the engine 30 so that the engine is operated within a relatively narrow power range for maximum efficiency, while also minimizing variations in the engine speed so that the rotational speed of the crop-harvesting mechanisms 42 remains relatively constant at a level which minimizes grain loss. Consequently, crop losses are minimized throughout the entire harvesting operation, regardless of the field and crop conditions encountered in different regions of the harvesting area.

Figure 11:
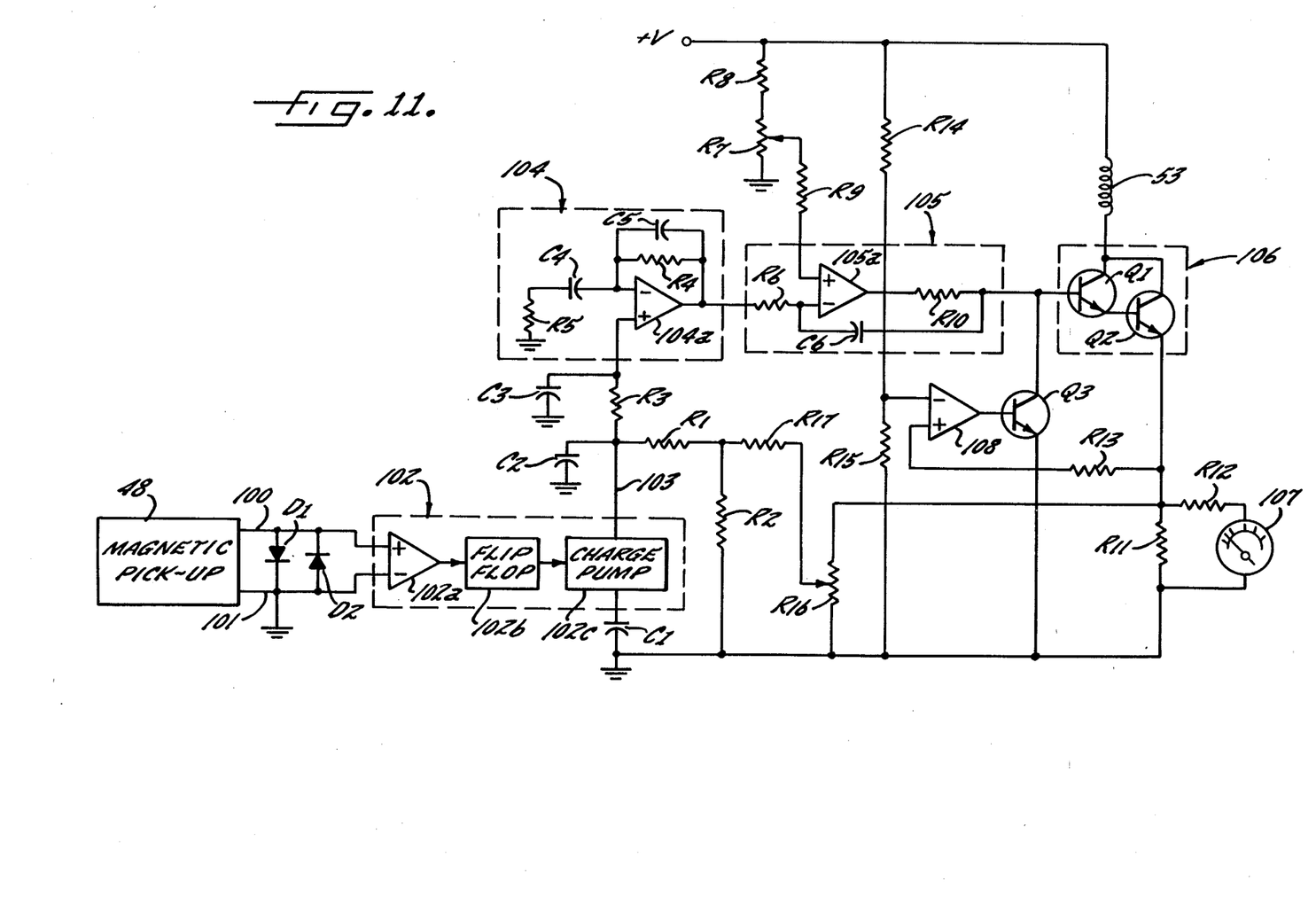
FIG. 11 is a schematic circuit diagram of the control circuitry associated with the control system of FIG. 2.

More specific circuitry for the electronic control unit 47 and the reference speed signal source 49 is illustrated in schematic form in FIG. 11. The actual speed signal, from the magnetic pickup device 48, is received across a pair of input lines 100 and 101. This signal is typically in the form of an AC signal whose frequency varies in direct proportion to variations in the actual engine speed. The lines 100 and 101 feed this frequency-modulated AC signal to a frequency-to-DC voltage converter 102, which is commercially available in the form of an integrated circuit "chip", such as the National Semiconductor LM2907. A pair of oppositely poled diodes D1 and D2 are connected in parallel across the terminals 100 and 101 to clip both the positive and negative half cycles of the AC input signal to a voltage level that is compatible with the converter 102. As a result, the signal supplied to the converter 102 is a square wave train alternating in value between the positive and negative voltage levels determined by the clipping diodes D1 and D2, and having a frequency equal to that of the AC speed-representing signal.

As its name implies, the frequency-to-DC voltage converter 102 generates an essentially DC output signal having a magnitude which is proportional to the frequency of the input signal received across the terminals 100 and 101, increasing with increasing frequency of the AC input and decreasing with decreasing frequency. The level of this output signal, which is produced on line 103, is also proportional to the actual engine speed, since it is that speed which determines the frequency of the input signal in the first place. The output of the converter 102 has a certain amount of ripple, but can be filtered to produce a substantially pure DC signal.

The first stage of the converter 102 is a differential amplifier 102a driving a positive feedback flip-flop circuit 102b. A charge pump 102c follows the flip-flop circuit for converting the input frequency to a DC voltage. In each half-cycle of an input signal having a frequency f, an external timing capacitor C1 is charged or discharged linearly between two voltages whose difference is $V_{cc}/2$, and the average amount of current $i_c$ pumped into or out of the capacitor C1 is:

$$i_c = V_{cc} \times C1 \times f$$

This current $i_c$ is fed through a pair of output resistors R1 and R2 in series with each other. The ripple in the output signal is smoothed out by filter networks formed by resistors R1, R2 and R3 and a pair of capacitors C2 and C3.

It will be recognized by those skilled in the art that the circuitry described thus far represents only one of many possible arrangements for converting the AC signal produced by the magnetic pick-up device 48 into a DC signal, and that this circuitry may be replaced by alternative circuits which perform equivalent functions. Certain speed signal generators may produce the desired DC signal directly, without the use of any filters.

In order to provide a rapid reponse to any change in the level of the filtered signal from the converter 102, due to a change in the engine speed monitored by the magnetic pickup device 48, this signal is supplied to a differentiator 104 whose output is the summation of the signals supplied to the two inputs of an operational amplifier 104a. The non-inverting input of the amplifier 104a receives the filtered "speed" signal, and the inverting input is connected to a feedback resistor R4 and a capacitor C4 which develop the derivative (sometimes referred to as a "lead" term) of the signal supplied to the non-inverting input (see the waveforms of FIG. 12, to be described below). Capacitor C5 and resistor R5 are provided for high frequency filtering.

Figure 12:
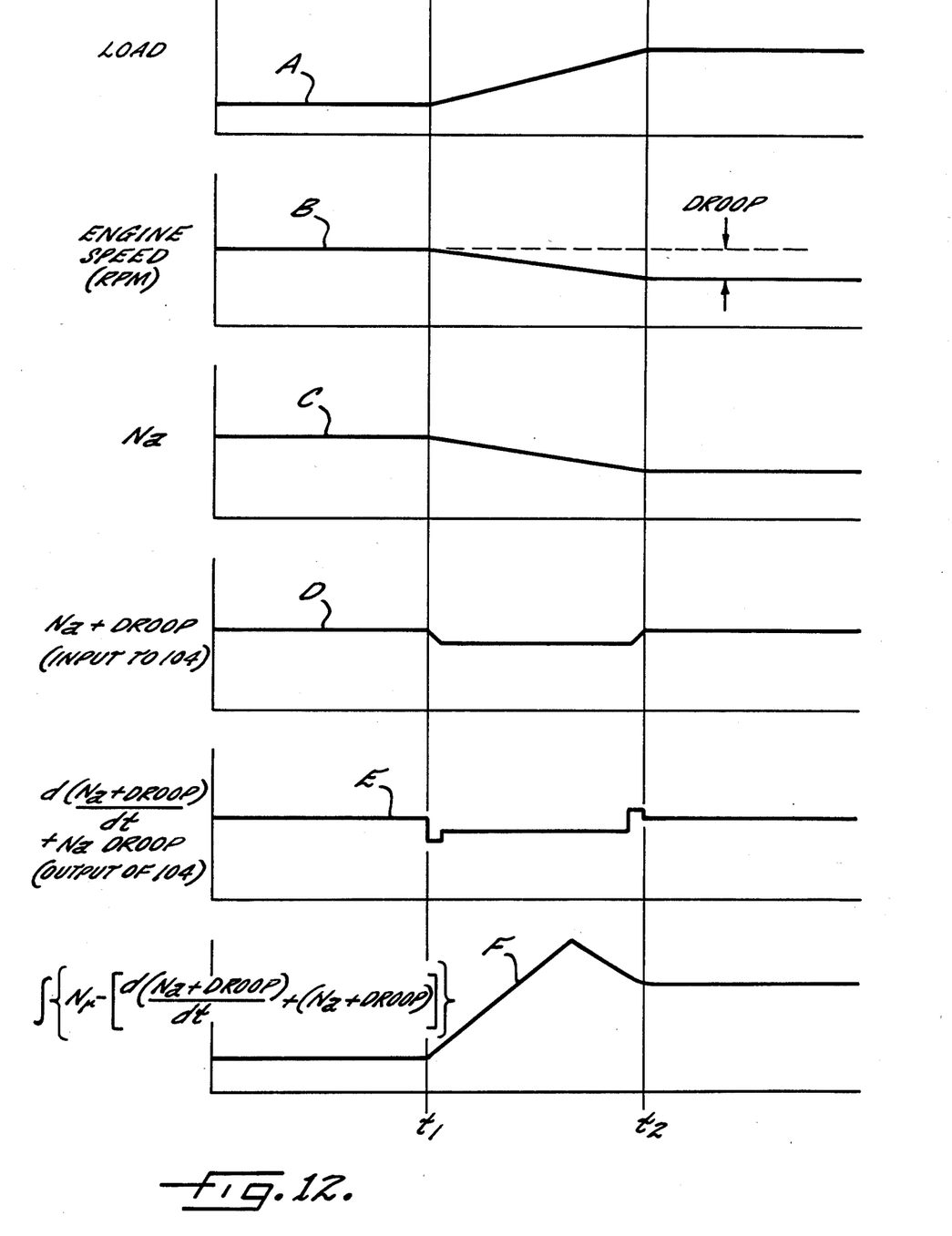
FIG. 12 is a series of waveforms illustrating the operation of the circuit of FIG. 11.

The output signal from the amplifier 104a is fed to an integrator 105 which also serves as a differential amplifier. The integrating action (sometimes referred to as a "lag" term) is provided by the combination of a resistor R6 and capacitor C6 associated with the inverting input of a differential amplifier 105a which receives the output signal from the amplifier 104a. The other input to the differential amplifier 105a is a "speed reference" signal supplied to the non-inverting input. This reference signal is a DC signal whose magnitude represents the reference speed setting for the engine 30 and is determined by the position of the wiper of a potentiometer R7. A voltage divider is formed by the combination of a resistor R8 connected in series with the potentiometer R7 between a positive reference voltage supply +V and ground. Thus, the level of the reference speed setting can be adjusted by moving the position of the wiper of the potentiometer R7, thereby controlling the level of the DC signal which is applied via resistor R9 to the non-inverting input of the amplifier 105a. This potentiometer wiper is attached to a "load set" adjustment knob LS on the operator control panel (FIG. 5).

By virtue of its integrating response, the output of the differential amplifier 105a is a signal whose magnitude is proportional to the time integral of the difference between the magnitudes of the two input signals (see the waveforms of FIG. 12, to be described below). This output signal will be referred to herein as the "speed error" signal, and is supplied through a resistor R10 a driving amplifier 106. The resistor R10 serves to reduce the voltage level of the signal to the desired level for the base voltage of the first transistor Q1 in the amplifier 106.

The driving amplifier 106 is formed by a pair of transistors Q1 and Q2 connected as a Darlington pair. More specifically, the base of the transistor Q1 receives the speed error signal from the differential amplifier 105a; the emitter of the transistor Q1 is connected to the base of the transistor Q2; the collectors of the two transistors Q1 and Q2 are both connected to the voltage supply +V via the solenoid coil 53 of the proportional acuator 45; and the emitter of the transistor Q2 is connected to ground through a current-sensing resistor R11. When the magnitude of the speed error signal increases due to a reduction in the actual speed relative to the reference speed, the transistors Q1 and Q2 increase the current flow through the solenoid coil 53, thereby energizing the actuator 45 to move the transmission control lever in a direction that reduces the ground speed of the combine, thereby reducing the ground load on the engine. Conversely, when the magnitude o.f the speed error signal drops due to an increase in the actual speed relative to the reference speed, the transistors Q1 and Q2 reduce the current flow through the solenoid coil 53 of the actuator 45, thereby moving the transmission control lever in a direction that increases the ground speed of the vehicle, thereby increasing the ground load on the engine. The effect of these changes on both the engine speed and the ground speed of the combine will be described in more detail below.

To provide a visible indication of the magnitude of the DC current supplied to the solenoid coil 53 of the actuator 45, a milliammeter 107 and a current-limiting resistor R12 are connected across the sensing resistor R11. This meter 107 is preferably mounted on the control panel in the cab of the combine to provide the operator with an indication of the position of the transmission control lever at any given time. That is, the lower the current flow through the actuator coil, the farther the transmission control lever will be displaced from the "neutral" position toward the "full forward" position, and thus the greater will be the ground speed of the combine. As illustrated in FIG. 5, the scale of the meter 107 is preferably calibrated to represent the position of the transmission control lever rather than the current level.

For the purpose of limiting the base drive current supplied to the transistor Q1, the emitter of the transistor Q2 is also connected to the non-inverting input of a differential amplifier 108, through a resistor R13. The inverting input of this amplifier 108 receives a reference signal from a voltage divider formed by a pair of resistors R14 and R15 connected in series between the voltage supply +V and ground. As long as the signal applied to the non-inverting input of the differential amplifier 108 remains below the level of the reference signal supplied to the inverting input of this amplifier, indicating that the base drive current to the transistor Q1 is below the limit set by the reference signal, the output of the amplifier 108 is negative and cuts off a transistor Q3. If the non-inverted input signal to the amplifier 108 rises above the inverted input signal, however, the output of the amplifier 108 goes positive and the transistor Q3 begins to conduct. The emitter-collector circuit of the transistor Q3 is connected between the base of the transistor Q1 and ground, so that conduction of the transistor Q3 diverts a portion of the drive current away from the base of the transistor Q1, thereby providing the desired limiting action.

One important aspect of the preferred embodiment of this invention is the introduction of a "speed droop" characteristic into the control unit 47 that controls the transmission setting via the actuator 45. That is, as the transmission control lever 44 is shifted to different positions to control the ground speed of the combine and the corresponding ground load on the engine, it is *not* shifted to positions that will maintain a perfectly constant engine speed, i.e., for isochronous operation. Nor does it permit the engine speed to follow the normal speed droop characteristic of the engine governor. Instead, the transmission control lever 44 is shifted to positions that cause the engine speed to follow a special droop characteristic that preferably has a much smaller amount of droop than does the droop characteristic of the engine governor. Consequently, the engine speed varies only slightly —not enough to significantly downgrade the performance of the crop-harvesting mechanisms—with changing terrain, crop density, etc., and yet the changes in the ground speed of the combine are greatly reduced from the changes that would be required for isochronous operation.

The net effect of this unique control system, working in conjunction with the standard engine governor, is to re-shape the normal speed droop characteristic of the engine governor to provide more efficient operation of the crop-harvesting mechanisms while maintaining efficient operation of the engine under the control of the engine governor. These results are achieved by adjusting the load on the engine—via the hydrostatic transmission—to produce only a minimal amount of speed droop along with modest changes in ground speed. The end result is a significant improvement in the overall productivity of the combine.

In the particular embodiment illustrated, the droop characteristic of the transmission control system is produced and controlled by a feedback loop which modifies the output signal from the frequency-to-DC voltage converter 102 so that this "actual speed" signal seems to represent a speed slightly greater than the speed actually sensed by the magnetic pickup device 48. This feedback signal varies in proportion to the signal that energizes the proportional actuator 45, which means that it varies with the movement of the transmission control lever over its operating range from "neutral" to "full forward". More particularly, as the transmission lever 44 is moved toward "neutral" to compensate for an increasing load on the engine—such movement being effected by *increasing* the current flow through the actuator winding 77—the feedback signal is gradually increased so that when it is added to the output of the converter 102, the resultant "actual speed" signal simulates a speed somewhat greater than the true speed. Consequently, the control system will not bring the actual speed all the way up to the reference speed, and this gap between the actual speed and the reference speed will gradually increase with increasing load. That is, the actual engine speed will "droop" from the constant reference speed setting, with the amount of droop increasing with increasing load; in a typical case, this droop amounts to a total speed reduction of about 1 to 5% between no load and full load.

Referring now specifically to FIG. 11, the "droop" feedback signal is produced by connecting a potentiometer R16 from the emitter of the transistor Q2 to ground, and connecting the wiper of the potentiometer R16 to a point between the output resistors R1 and R2 via a fixed resistor R17. This creates a feedback loop which increases the voltage level of the output signal from the converter 102 by an amount that is proportional to the level of drive current supplied to the actuator 45 via the emitter-collector circuits of the transistors Q1 and Q2. For example, an increase in drive current from 50 to 150 milliamperes typically increases the voltage drop across the potentiometer from about 0.45 to 1.35 volts, which in turn increases the voltage at the non-inverting input of the amplifier 104 from about 1.9 to about 2.1 volts, depending upon the position of the wiper on the potentiometer R16. This wiper is preferably accessible to the combine operator, and in the control panel illustrated in FIG. 5 is attached to a "grade compensation" knob GC. By adjusting the wiper position on the potentiometer, the operator can adjust the amount of speed droop in the system, which in turn affects the extent to which the ground speed of the combine changes as the combine load changes.

FIG. 12 is a series of exemplary waveforms which illustrate the operation of the circuitry of FIG. 11 in response to an increase in engine load beginning at time t1 and levelling off at time t2, as illustrated by waveform A in FIG. 12. The resulting change in engine speed is represented by waveform B, which shows the engine speed dropping from an initial level at time t1 to a reduced level at time t2, with the difference between the two steady state levels representing the speed droop due to the change in engine load between times t1 and t2. Waveform C represents the "actual speed" signal $N_a$ generated by the magnetic pickup 48. The summation of the filtered speed signal from the converter 102 and the "droop" feedback signal is illustrated by waveform D and identified as a signal "$N_a+$droop" which is the input to the differentiator 104. The output of the differentiator is represented by waveform E, identified as the derivative d $(N_a+$droop$)/$dt$+(N_a+$droop$)$. The final waveform F is the "integral" signal which is the actual input to the driving amplifier 106 which supplies the energizing control signal to the actuator solenoid 53.

Figure 13:
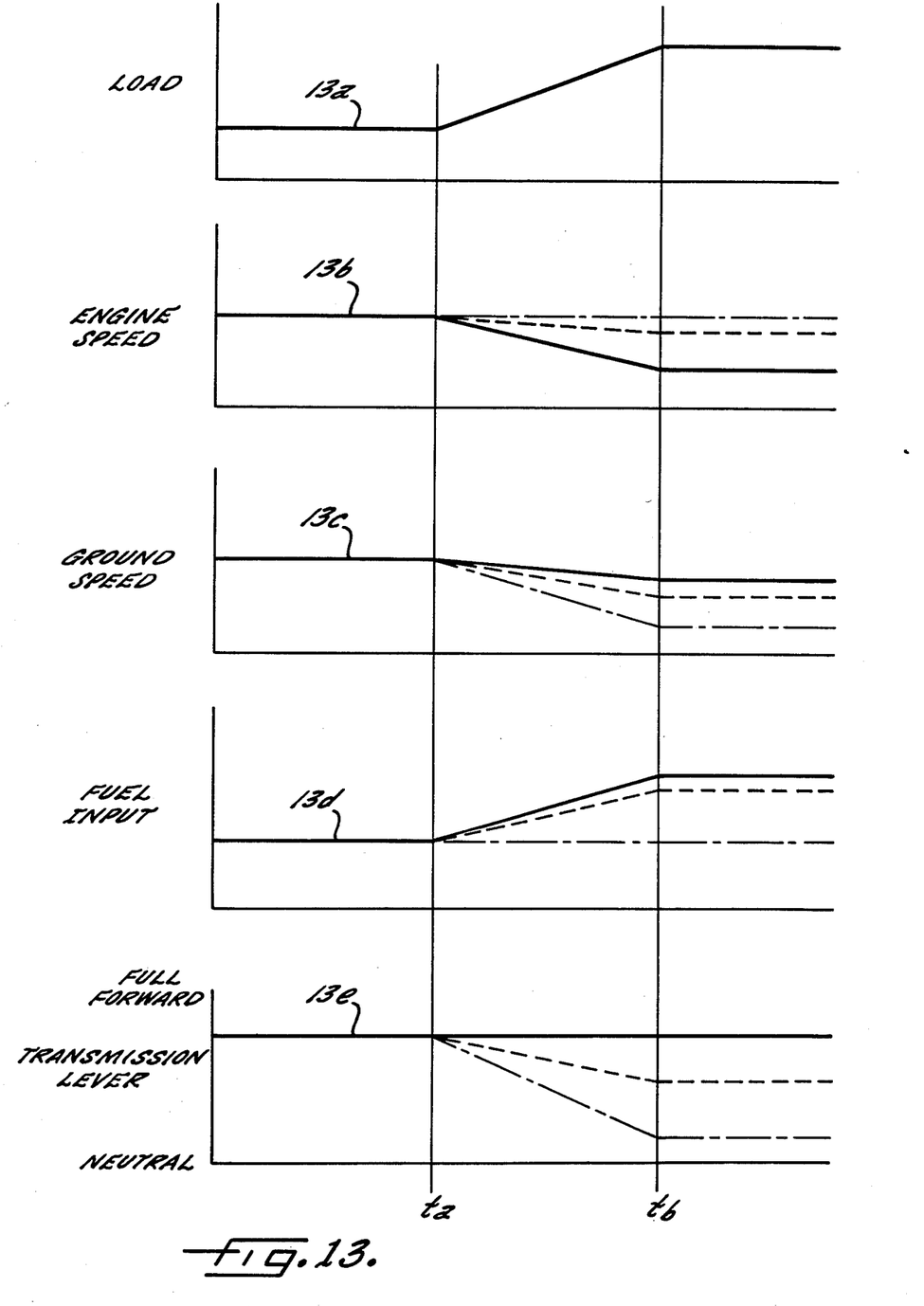
FIGS. 13a through 13e comprise a series of graphs illustrating the operation of the control system of FIG. 2 in response to changing load conditions.

The advantages offered by the present invention can be more fully appreciated by referring to the performance characteristics illustrated in FIGS. 13a–13e. FIG. 13a illustrates a load change encountered by a combine at time ta, with the load increasing linearly until time tb, where the load levels off again. This load change could represent a combine starting up a hill at time ta, or starting to run into a higher density crop at time ta. FIGS. 13b–13e represent the resultant changes in engine speed, ground speed, fuel input, and transmission lever position for combines with three different types of control systems. The solid line represents a combine with nothing more than the standard "speed droop" engine governor; the dashed line represents a combine equipped with a control system of the type described above; and the dot-dash line represents a combine equipped with a control system of the type described above but without the droop feature in the transmission control unit.

Referring first to the solid-line curves in FIGS. 13b–13e, representing the combine with only a standard "speed droop" governor, it can be seen that the governor increases the fuel input to the engine steadily as long as the load is increasing, and at the same time the engine speed steadily drops due to the combined effect of the increasing load and the droop characteristic of the governor. The ground speed is reduced only slightly by the load change, and the transmission lever position remains fixed because there is no automatic control for the transmission. The reduced engine speed degrades the efficiency of the crop-harvesting mechanisms.

With the combine equipped with the control system described above, including the droop feature in the transmission control unit, the broken-line curves illustrate that the transmission lever is shifted toward neutral to partially, but not totally, compensate for the increase in load, thereby causing a slight reduction in engine speed. The droop governor increases the fuel input to the engine at a slightly lower rate than in the combine without any transmission control, and the ground speed is reduced slightly more than in the combine without any transmission control.

As illustrated by the dot-dash curves, the combine with an automatic control system of the type described above but without the droop feature in the transmission control unit, responds to the load increase by shifting the transmission lever far enough toward neutral to fully compensate for the increased load. The result is a constant engine speed, i.e., isochronous operation, with no increase in fuel input. As a result, the ground speed of the combine is reduced substantially, resulting in greatly reduced productivity of the combine, and perhaps even stalling the combine on an uphill grade.

Although the invention has been described above with reference to a system which controls the transmission lever actuator in respose to variations in the engine speed, the actuator control signal could be produced in response to other parameters indicative of the load on the engine. One example of such an alternative parameter is turbocharger pressure, which is capable of being represented by an electrical signal produced by an appropriate transducer, in the same way that the engine speed is represented by the signal produced by the magnetic pickup device in the exemplary system described above.

As can be seen from the foregoing detailed description, this invention provides an improved control system which automatically regulates the drive train of a combine to operate both the crop-harvesting mechanisms and the drive engine at high levels of efficiency in the face of changing load conditions on both the vehicle and the harvesting mechanisms. The improved control system quickly and automatically compensates for variations in the crop being harvested and/or the terrain over which the combine is being driven. By automatically reducing the normal speed droop characteristic of the engine governor to provide more efficient operation of the crop-harvesting mechanisms while maintaining efficient operation of the engine under the control of the engine governor, the preferred embodiment of the invention significantly improves the overall productivity of the combine. This system operates the combine at a sustained high efficiency level regardless of the skill or fatigue level of the human operator, and minimizes grain losses regardless of the condition of the crop being harvested. In emergency situations, the human operator can override the automatic control system if desired.

In the embodiments described above and illustrated in the accompanying drawings, analog signals created and processed by analog circuits have been described. It is, however, well known to those skilled in the control art that digital signals (with appropriate analog-to-digital and digital-to-analog converters, as needed) may be employed to signal different variables, with a programmed digital computer performing various arithmetic, gain, derivative or integral functions with such signals. The computer iterates its operations at such short intervals that each signaled quantity, in practical effect, varies continuously. Because those working in the art can with routine skill embody the control apparatus here disclosed in various forms employing digital signals and digital computers, it is to be understood that the claims which follow embrace such digital embodiments. To illustrate and describe specific digital embodiments would unnecessarily lengthen the present specification, and the analog apparatus here shown and described provides to those of ordinary skill in the art all of the necessary teachings required to construct digital apparatus for practicing and embodying the methods and apparatus here disclosed and claimed.

We claim:

1. A method of controlling a crop-processing vehicle having an engine for driving both the ground wheels of the vehicle and a crop-processing mechanism, and a speed droop governor for regulating the fuel input to the engine in response to changes in the engine speed, said speed droop governor having a first speed droop characteristic, the engine being coupled to the ground wheels through a hydrostatic transmission, and the power takeoff for the crop-processing mechanism being located on the engine side of the hydrostatic transmission, said method comprising the steps of regulating the fuel input to the engine in response to changes in engine load, the speed of the engine being gradually reduced as fuel input is increased, and regulating the setting of said hydrostatic transmission in response to changes in at least one parameter that varies with engine load, generating a signal representing a droop factor for controlling the setting of said transmission to vary the ground speed of the engine in accordance with variations in said parameter so as to control the speed changes effected by said droop governor according to a second speed droop characteristic in which said first speed droop characteristic is a factor.

2. A control method as set forth in claim 1 wherein said transmission adjustments vary said engine speed over a range of about 1% to about 5% of the no-load speed.

3. A method of controlling a vehicle having an engine for driving both the ground wheels of the vehicle and at least one auxiliary mechanism, and a speed droop governor for regulating the fuel input to the engine in response to changes in the engine speed, said governor having a first speed droop characteristic, the engine being coupled to the ground wheels through a hydrostatic transmission and to the auxiliary mechanism through a power takeoff on the engine side of the transmission, said method comprising the steps of generating an electrical control signal that varies as a function of (1) a speed error signal which varies with changes in the difference between the actual speed of the engine and a reference speed for the engine, and (2) a droop factor having a second speed droop characteristic for controlling the setting of said transmission, and adjusting said hydrostatic transmission to regulate the ratio between the engine speed and the ground speed of said vehicle, thereby adjusting the load on said engine and the power transmitted to said ground wheels, in response to said electrical control signal, said droop factor in said control signal causing the resulting speed change effected by the adjustment of said transmission to follow a speed droop characteristic in which said first and second speed droop characteristics are factors.

4. In a vehicle having an engine for driving both the ground wheels of the vehicle and at least one auxiliary mechanism, and a speed droop governor having a first droop characteristic for regulating the fuel input to the engine in response to changes in the engine speed, the engine being coupled to the ground wheels through a hydrostatic transmission and to the auxiliary mechanism through a power takeoff on the engine side of the transmission, a control system comprising an actuator connected to said hydrstatic transmission for adjusting said transmission to regulate the gear ratio between the engine and the ground wheels, thereby adjusting the load on said engine and the power transmitted to said ground wheels, in response to an electrical control signal, means for generating electrical signals representing the actual speed of the engine, a reference speed for the engine, and a speed error signal corresponding to the difference between said actual and said reference speeds, means for generating said electrical control signal for said actuator as a function of said speed error signal, and means for adding to said speed error signal a second droop characteristic in which said first droop characteristic is a factor.

5. A control system as set forth in claim 4 wherein said actuator is an electrohydraulic device, said hydrostatic transmission includes a charge pump, and the output of said charge pump is connected to said actuator for furnishing said actuator with pressurized hydraulic fluid.

6. A control system as set forth in claim 4 wherein said actuator is connected to said hydrostatic transmission through a mechanical linkage that includes means for manually overriding said actuator in the event of an emergency.

7. A control system as set forth in claim 4 wherein said electrical control signal varies in proportion to the magnitude of said speed error signal, a time derivative of said speed error signal, and a time integral of said speed error signal.

8. A control system as set forth in claim 4 wherein said actuator is a proportional actuator which adjusts said transmission in direct proportion to the magnitude of said control signal.

9. In a crop-processing vehicle having an engine for driving both the ground wheels of the vehicle and a crop-processing mechanism, a speed droop governor having a first droop characteristic for regulating the fuel input to the engine in response to changes in the engine speed, the engine being coupled to the ground wheels through a hydrostatic transmission, and the power takeoff for the crop-harvesting mechanism being located on the engine side of the hydrostatic transmission, a control system comprising an actuator connected to said hydrostatic transmission for adjusting said transmission, thereby adjusting the load on said engine and the power transmitted to said ground wheels, in response to an electrical control signal, and means for generating said electrical control signal in response to variations in at least one parameter which varies with changes in the load on said engine, said control signal including a second droop characteristic in which said first droop characteristic is a factor so that said transmission adjustments vary the engine speed in inverse proportion to variations in engine load and by a smaller amount than the speed change that would otherwise be effected by the adjustment of said fuel input by said speed droop governor.

10. A control system as set forth in claim 9 wherein said means for generating said electrical control signal comprises means for generating electrical signals representing the actual speed of said engine, the desired speed of said engine, and a speed error value that varies as a function of the difference between said actual and desired speeds, and means for adding a droop factor to said speed error signal to produce said electrical control signal.

11. A control system as set forth in claim 9 wherein said actuator is an electrohydraulic device, said hydrostatic transmission includes a charge pump, and said charge pump is connected to said actuator for furnishing said actuator with pressurized hydraulic fluid.

12. In a crop-processing vehicle having an engine for driving both the ground wheels of the vehicle and a crop-processing mechanism, the engine being coupled to the ground wheels through a hydrostatic transmission, and the power takeoff for the crop-processing mechanism being located on the engine side of the hydrostatic transmission, a control system comprising a speed droop governor having a first droop characteristic for adjusting the fuel input to said engine as a function of engine speed, said governor being designed to reduce the engine speed as the engine load increases, and a transmission control unit for adjusting said transmission as a function of at least one parameter that varies with engine load, to compensate for a substantial portion of the engine speed reductions that would otherwise be effected by said governor, said transmission control unit including means for generating a signal representing a droop factor, said signal controlling the adjustment of said transmission to reduce the engine speed only slightly as the engine load increases, with a modest reduction in the ground speed of the combine, so that the engine speed follows a second droop characteristic in which said first droop characteristic is a factor.

13. A control system as set forth in claim 12 wherein said parameter is actual engine speed.

14. In a crop-harvesting vehicle having an engine for driving both the ground wheels of the vehicle and the crop-harvesting mechanism, the engine being coupled to the ground wheels through a hydrostatic transmission and to the crop-harvesting mechanism through a power take off on the engine side of the transmission, a control system comprising a speed droop governor having a first droop characteristic for adjusting the fuel input to the engine in response to changes in the load on the engine as reflected by changes in the speed of the engine, said fuel input adjustments regulating the engine speed according to a first "speed droop" characteristic defining engine speed values which vary in inverse proportion to variations in engine load, and transmission control means for adjusting the setting of said hydrostatic transmission, and thus the load applied to the engine via said transmission, in response to variations in a parameter that varies with the changes in the load on the engine, said transmission control means including means for generating a signal representing a droop factor, said signal controlling the adjustment of said hydraulic transmission to regulate the engine load according to a second "speed droop" characteristic, in which said first speed droop characteristic is a factor, defining engine load values which vary in inverse proportion to variations in engine speed, said second "speed droop" characteristic having a lower slope than said first characteristic, so that the resultant speed change effected by the adjustment of said transmission setting is substantially smaller than the speed change that would otherwise be effected by the adjustment of said fuel input.

15. A control system as set forth in claim 14 wherein said parameter is the actual engine speed.

16. A control system as set forth in claim 14 wherein said transmission control means includes means for generating an electrical signal representing the actual speed of the engine, means for generating an electrical signal representing a reference speed setting for the engine, means responsive to said actual speed signal and said reference speed signal for generating a speed error signal which varies as a function of the difference between said actual speed signal and said reference speed signal, and actuator means for adjusting said hydrostatic transmission in response to said speed error signal.

* * * * *